United States Patent
Yabuoshi

(10) Patent No.: US 11,554,738 B2
(45) Date of Patent: Jan. 17, 2023

(54) IMPACT ABSORPTION STRUCTURE

(71) Applicant: TOYOTA JIDOSHA KABUSHIKI KAISHA, Aichi-ken (JP)

(72) Inventor: Masahito Yabuoshi, Chiryu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/496,718

(22) Filed: Oct. 7, 2021

(65) Prior Publication Data

US 2022/0219635 A1 Jul. 14, 2022

(30) Foreign Application Priority Data

Jan. 12, 2021 (JP) .............................. JP2021-002980

(51) Int. Cl.
*B60R 21/045* (2006.01)

(52) U.S. Cl.
CPC .................................. *B60R 21/045* (2013.01)

(58) Field of Classification Search
CPC .......... B60R 2021/0051; B60R 21/045; B60R 21/206; B60R 21/231; B60R 21/26
See application file for complete search history.

(56) References Cited

U.S. PATENT DOCUMENTS

| | | | |
|---|---|---|---|
| 7,802,839 B2 * | 9/2010 | Ajisaka | B62D 21/152 296/203.02 |
| 8,602,183 B2 * | 12/2013 | VandenBerge | F16F 7/128 188/372 |
| 9,499,120 B1 * | 11/2016 | Stancato | B60R 21/045 |
| 2004/0256842 A1 * | 12/2004 | Breed | D06N 3/0063 280/730.1 |
| 2011/0012329 A1 * | 1/2011 | Sekino | B60R 21/21 280/736 |
| 2012/0248742 A1 * | 10/2012 | Kalisz | B60R 21/02 280/743.1 |
| 2018/0056913 A1 | 3/2018 | Tani et al. | |

FOREIGN PATENT DOCUMENTS

| | | |
|---|---|---|
| JP | 2016168891 A | 9/2016 |
| JP | 2017206257 A | 11/2017 |
| WO | 2013182282 A1 | 12/2013 |

* cited by examiner

*Primary Examiner* — James M Dolak
*Assistant Examiner* — Daniel M. Keck
(74) *Attorney, Agent, or Firm* — Hauptman Ham, LLP

(57) ABSTRACT

A vehicle knee bolster to which an impact absorption structure according to the present disclosure is applied includes a blow molding body attached to an instrument panel reinforcement of a vehicle via a bracket. When the vehicle has a collision, the blow molding body deforms plastically by being compressed between the bracket and a knee of an occupant. The blow molding body has an orifice (air discharge hole) through which air inside the blow molding body is discharged to outside when an internal pressure of the blow molding body increases due to the compression.

10 Claims, 10 Drawing Sheets

IMPACT ABSORPTION STRUCTURE

CROSS-REFERENCE TO RELATED APPLICATION

This application claims priority to Japanese Patent Application No. 2021-002980 filed on Jan. 12, 2021, incorporated herein by reference in its entirety.

BACKGROUND

1. Technical Field

The present disclosure relates to an impact absorption structure including a hollow body.

2. Description of Related Art

Japanese Unexamined Patent Application Publication No. 2016-168891 (JP 2016-168891 A) describes a knee bolster configured to absorb an impact to the knees of an occupant of a vehicle by deforming upon receipt of a load from the knees. The knee bolster is constituted by a hollow blow molding body manufactured by blow molding. A transverse groove rib for raising yield strength to the load from the knees of the occupant is formed in the knee bolster.

SUMMARY

The knee bolster constituted by a hollow blow molding body is inexpensive and light in weight in comparison with a knee bolster made of a steel sheet, a knee bolster made of hard urethane foam, or the like, and further, a reaction force to be applied to the knees rises satisfactorily in the knee bolster constituted by the hollow blow molding body. However, the knee bolster constituted by the hollow blow molding body might crack by buckling, so that air inside the knee bolster leaks out and the reaction force rapidly decreases in some cases. Particularly, a stress concentrates on the transverse groove rib, so that a crack easily occurs.

The present disclosure is achieved in consideration of the above fact, and an object of the present disclosure is to provide an impact absorption structure that can restrain a rapid decrease in a reaction force to be applied to an occupant from a hollow-shaped impact absorber.

An impact absorption structure according to a first aspect includes an impact absorber formed in a hollow shape and attached to an attachment portion provided in a vehicle cabin of a vehicle. When the vehicle has a collision, the impact absorber deforms plastically by being compressed between the attachment portion and the occupant. The impact absorber has an air discharge hole through which air inside the impact absorber is discharged to outside when an internal pressure of the impact absorber increases due to the compression.

In the first aspect, when the vehicle has a collision, the impact absorber formed in a hollow shape and attached to the attachment portion provided in the vehicle cabin of the vehicle deforms plastically by being compressed between the attachment portion and the occupant. The impact absorber has the air discharge hole through which the air inside the impact absorber is discharged to outside when the internal pressure of the impact absorber increases due to the compression. Due to a viscous resisting force of the air flowing out through the air discharge hole, a crack or the like can hardly occur in the impact absorber in the middle of the deformation. This makes it possible to restrain a rapid decrease in a reaction force to be applied to the occupant from the impact absorber.

An impact absorption structure according to a second aspect is configured as follows. That is, in the first aspect, the impact absorber may have the air discharge hole in a wall portion attached to the attachment portion.

In the second aspect, in the impact absorber, the air discharge hole is provided in the wall portion attached to the attachment portion. The wall portion is a part which does not largely deform at the time when the impact absorber is compressed and which can be hardly displaced relative to the attachment portion. Accordingly, in comparison with a configuration in which an air discharge hole is provided in a wall portion other than the above wall portion, measures to prevent the air discharge hole from being closed unexpectedly can be easily taken.

An impact absorption structure according to a third aspect is configured as follows. That is, in the second aspect, a vicinal part around the air discharge hole in the wall portion of the impact absorber may be provided as a recessed portion recessed to a side reverse to the attachment portion.

In the third aspect, in the wall portion, of the impact absorber, that is attached to the attachment portion, the vicinal part around the air discharge hole is provided as the recessed portion recessed to the side reverse to the attachment portion. Hereby, it is possible to prevent discharge of the air through the air discharge hole from being disturbed by the attachment portion, with a simple configuration.

An impact absorption structure according to a fourth aspect is configured as follows. That is, in the second aspect or the third aspect, the attachment portion may be formed in a shape opened at a part facing the air discharge hole.

In the fourth aspect, the attachment portion to which the impact absorber is attached is formed in a shape opened at a part facing the air discharge hole of the impact absorber. Hereby, it is possible to prevent discharge of the air through the air discharge hole from being disturbed by the attachment portion, with a simple configuration.

An impact absorption structure according to a fifth aspect is configured as follows. That is, in the fourth aspect, the attachment portion may be a bracket fixed to an interior member of the vehicle. The air discharge hole may communicate with a gap formed between the bracket and the interior member.

In the fifth aspect, the impact absorber is fixed to the bracket fixed to the interior member of the vehicle. The bracket is formed in a shape opened at a part facing the air discharge hole of the impact absorber. The air discharge hole of the impact absorber communicates with a gap formed between the bracket and the interior member. Accordingly, when the impact absorber is compressed, the air inside the impact absorber can be discharged to the gap through the air discharge hole.

An impact absorption structure according to a sixth aspect is configured as follows. That is, in any one of the first aspect to the fifth aspect, a projecting shape projecting outwardly from the impact absorber or a recessed shape recessed inwardly in the impact absorber may be given to a peripheral wall portion, of the impact absorber, via which a wall portion placed to face the attachment portion is connected to a wall portion placed to face the occupant, the projecting shape or the recessed shape being formed in a circumferential direction of the impact absorber.

In the sixth aspect, the projecting shape or the recessed shape is given to the peripheral wall portion of the impact absorber. Accordingly, when the impact absorber is compressed between the attachment portion and the occupant, the peripheral wall portion can be deformed as set, thereby making it possible to achieve a stable deformation mode of the impact absorber.

An impact absorption structure according to a seventh aspect is configured as follows. That is, in any one of the first aspect to the sixth aspect, in addition to the air discharge hole, the impact absorber may have an additional air discharge hole through which the air inside the impact absorber is discharged to outside when the internal pressure of the impact absorber increases due to the compression, the additional air discharge hole being formed in a part, of the impact absorber, that is to be crushed when the impact absorber is compressed.

In the seventh aspect, when the impact absorber is compressed, the air is also discharged through the additional air discharge hole in addition to the above air discharge hole. Note that the additional discharge hole is provided in the part to be crushed in the impact absorber at the time when the impact absorber is compressed. When the part is crushed, the additional air discharge hole is closed or narrowed, so that the discharge of the air through the additional air discharge hole is disturbed. This makes it possible to change a reaction force to be applied to the occupant from the impact absorber in a stepwise manner.

An impact absorption structure according to an eighth aspect is configured as follows. That is, in the seventh aspect, the impact absorber may have a plurality of additional air discharge holes.

In the eighth aspect, the impact absorber has the additional air discharge holes. Accordingly, by changing hole diameters, positions, or the like of the additional air discharge holes, for example, it is possible to adjust a timing to change the reaction force to be applied to the occupant from the impact absorber or a magnitude of the reaction force. Further, for example, it is also possible to change the reaction force in a multistage manner.

An impact absorption structure according to a ninth aspect is configured as follows. That is, in the seventh aspect dependent on the sixth aspect or the eighth aspect dependent on the sixth aspect, the part may be a part, of the peripheral wall portion, to which the projecting shape or the recessed shape is given.

In the ninth aspect, the projecting shape or the recessed shape is given to the peripheral wall portion, of the impact absorber, via which the wall portion placed to face the attachment portion is connected to the wall portion placed to face the occupant. The additional air discharge hole is provided in the part to which the projecting shape or the recessed shape is given. When the part is crushed in a compression direction as set at the time when the impact absorber is compressed, the additional air discharge hole can be closed or narrowed as set.

An impact absorption structure according to a tenth aspect is configured as follows. That is, in any one of the first aspect to the ninth aspect, the impact absorber may be a blow molding body manufactured by blow molding.

In the tenth aspect, the impact absorber is a blow molding body. Accordingly, in comparison with a configuration in which a hollow-shaped impact absorber is manufactured by joining a plurality of members manufactured by injection molding, for example, the impact absorber can be manufactured easily at low cost.

An impact absorption structure according to an eleventh aspect is configured as follows. That is, in any one of the first aspect to the tenth aspect, the impact absorber may be provided as a constituent component of a vehicle knee bolster and placed in front of a knee of the occupant in a vehicle front-rear direction.

In the eleventh aspect, when the vehicle has a front end collision, the hollow-shaped impact absorber deforms plastically by being compressed between the attachment portion and the knee of the occupant, so that an impact to the knee is absorbed. The configuration in which the hollow-shaped impact absorber deforms plastically can be simplified in comparison with a configuration in which the impact to the knee is absorbed by a knee airbag device including an airbag and an inflator, for example.

As described above, with the impact absorption structure of the present disclosure, it is possible to restrain a rapid decrease in a reaction force to be applied to the occupant from the hollow-shaped impact absorber.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
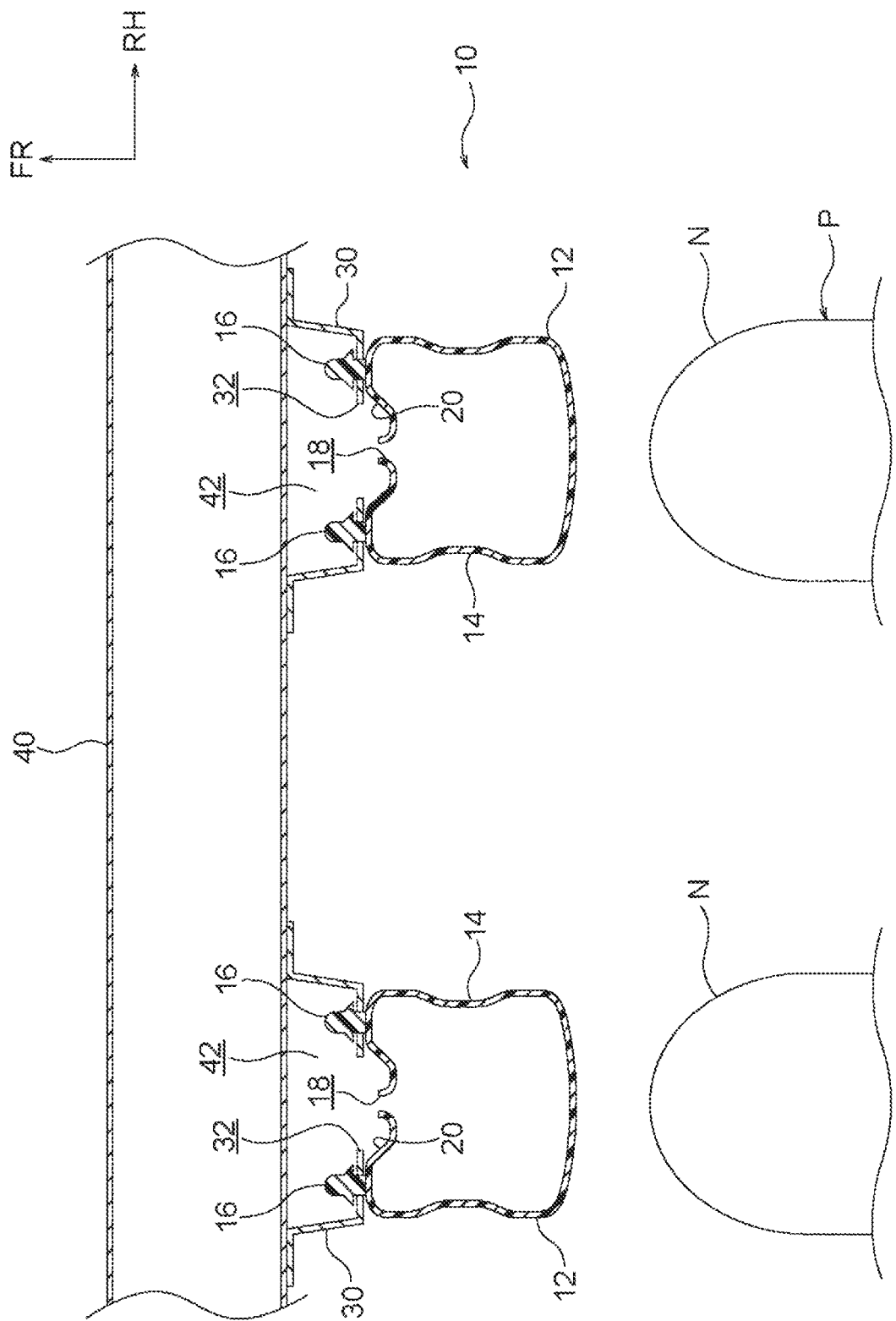
FIG. 1 is a sectional view illustrating a vehicle knee bolster to which an impact absorption structure according to a first embodiment is applied.

With reference to FIGS. 1 to 5, the following describes a vehicle knee bolster 10 to which an impact absorption structure according to a first embodiment of the present disclosure is applied. Note that, in each of the figures, some reference signs may be omitted in order to simplify the figures. Further, an arrow FR shown in each of the figures appropriately indicates the front side in the vehicle front-rear direction, and an arrow RH indicates the right side in the vehicle right-left direction. A front-rear direction, a right-left direction, and an up-down direction described below indicate directions based on a vehicle, unless otherwise specified.

The vehicle knee bolster 10 according to the first embodiment is a device configured to restrain knees N of an occupant P on a driver seat at the time when a vehicle has a front end collision. The vehicle knee bolster 10 includes a pair of right and left blow molding bodies 12 and a pair of right and left brackets 30. The blow molding body 12 corresponds to an "impact absorber" in the present disclosure, and the bracket 30 corresponds to an "attachment portion" in the present disclosure. The blow molding body 12 and the bracket 30 on the left side are placed in front of the left knee N of the occupant P, and the blow molding body 12 and the bracket 30 on the right side are placed in front of the right knee N of the occupant P.

The right and left blow molding bodies 12 are attached to an instrument panel reinforcement 40 via the right and left brackets 30. The instrument panel reinforcement 40 is an interior member of the vehicle and is made of a metal pipe material, for example. The instrument panel reinforcement 40 is placed in a posture with its axis direction being along the vehicle width direction. The instrument panel reinforcement 40 is placed inside an instrument panel (not illustrated) provided in a front part inside a vehicle cabin and is provided over between right and left vehicle body panels. Note that only part of the instrument panel reinforcement 40 is illustrated in FIG. 1.

The right and left brackets 30 are provided in front of the driver seat (not illustrated) such that the right and left brackets 30 are placed behind the instrument panel reinforcement 40 and are placed in front of, in the vehicle front-rear direction, the right and left knees N of the occupant P sitting on the driver seat. The right and left brackets 30 are manufactured by performing press molding on a metal plate, for example, and have a hat-shaped section opened forward when the right and left brackets 30 are viewed in the vehicle up-down direction. Each of the brackets 30 includes a rear wall portion 30A with its plate-thickness direction being along the vehicle front-rear direction, a pair of right and left side wall portions 30B provided such that the right and left side wall portions 30B extend forward in the vehicle front-rear direction from right and left end parts of the rear wall portion 30A, and a pair of right and left flange portions 30C provided such that the right and left flange portions 30C extend outward in the vehicle right-left direction from respective front end parts of the right and left side wall portions 30B. The right and left flange portions 30C are fixed to the instrument panel reinforcement 40 by welding or the like. An air outflow hole 32 that is a through-hole penetrating through the rear wall portion 30A in the front-rear direction is formed in a central part, in the right-left direction, of the rear wall portion 30A.

Figure 2:
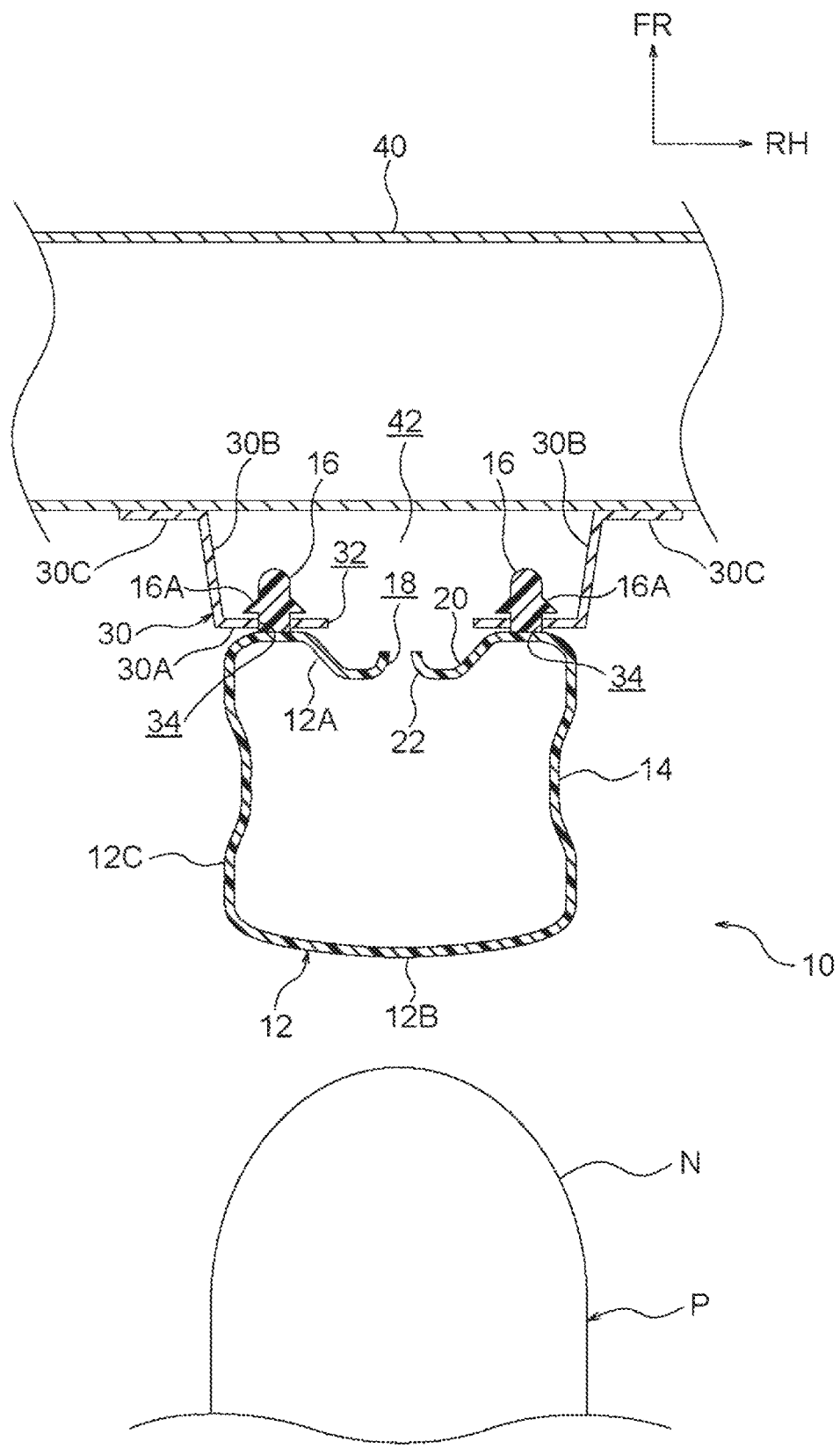
FIG. 2 is a sectional view illustrating a part of FIG. 1 in an enlarged manner.

The right and left blow molding bodies 12 are placed behind the right and left brackets 30 and are placed in front of, in the vehicle front-rear direction, the right and left knees N of the occupant P sitting on the driver seat. Note that part of the instrument panel (not illustrated) is provided between the right and left blow molding bodies 12 and the right and left knees N of the occupant P. The blow molding bodies 12 are manufactured by blow molding and are formed in a hollow shape. The material for the blow molding bodies 12 is resin having high impact resistance so that the resin is hard to crack. The material is, for example, polyethylene, polypropylene, or the like. The blow molding bodies 12 have a hollow hexahedron shape (a generally rectangular-solid shape having a hollow) with its longitudinal direction being along the vehicle up-down direction, as an example. As illustrated in FIG. 2, each of the blow molding bodies 12 has a front wall portion 12A placed to face the bracket 30, a rear wall portion 12B placed to face the occupant P, and a peripheral wall portion 12C via which the front wall portion 12A is connected to the rear wall portion 12B.

The peripheral wall portion 12C of the blow molding body 12 has a generally rectangular annular section when the peripheral wall portion 12C is viewed from the vehicle front-rear direction, for example. A recessed shape 14 is given to the peripheral wall portion 12C along the circumferential direction of the peripheral wall portion 12C. The recessed shape 14 is recessed inwardly in the blow molding body 12. A part, of the peripheral wall portion 12C, to which the recessed shape 14 is given is recessed inwardly in the blow molding body 12 so as to form a generally arcuate section. Although not illustrated herein, instead of the recessed shape 14, a projection shape projecting outwardly from the blow molding body 12 may be given to the peripheral wall portion 12C along the circumferential direction of the peripheral wall portion 12C.

The front wall portion 12A of the blow molding body 12 makes contact with the rear wall portion 30A of the bracket 30 from the rear side. Respective clips 16 are fixed to right and left end portions of the front wall portion 12A, and right and left clip insertion holes 34 are formed in the rear wall portion 30A of the bracket 30. Note that, as one example in the present embodiment, the number of the clips 16 and the number of the clip insertion holes 34 are two, but the present embodiment is not limited to this. The number of the clips 16 and the number of the clip insertion holes 34 are modifiable appropriately.

The right and left clips 16 are made of resin having high elasticity, for example, and are fixed to the front wall portion 12A by insert molding. The clips 16 project forward from the front wall portion 12A into a generally columnar shape such that the clips 16 are inserted into the right and left clip insertion holes 34. A rib portion 16A having a rib shape is formed in an intermediate part, in the front-rear direction, of each of the clips 16, and the rib portion 16A makes contact with a hole edge part of the clip insertion hole 34 from the front side. When the clip 16 is inserted into the clip insertion hole 34, the rib portion 16A of the clip 16 elastically deforms, and after that, the rib portion 16A elastically recovers, so that the rib portion 16A is caught on the hole edge part of the clip insertion hole 34. Thus, the blow molding body 12 is attached to the bracket 30 via the clips 16.

An orifice 18 that is an air discharge hole is formed in the front wall portion 12A to be attached to the bracket 30 in the blow molding body 12 as described above. The blow molding body 12 is configured not to have a hole or an opening other than the orifice 18. The orifice 18 is formed in a central part, in the right-left direction, of the front wall portion 12A as an example and faces the air outflow hole 32 of the bracket 30 from the rear side. That is, the bracket 30 is formed in a shape opened at a part facing the orifice 18. The inside of the blow molding body 12 communicates with the outside of the blow molding body 12 via the orifice 18. Instead of the air outflow hole 32, a notch or the like may be formed in a part of the bracket 30, the part facing the orifice 18.

The front wall portion 12A of the blow molding body 12 has a recessed portion 20 formed in a vicinal part around the orifice 18 such that the recessed portion 20 is recessed to a side reverse to the bracket 30 (toward the rear side). The hole edge part of the orifice 18 projects forward in a cylindrical shape inside the recessed portion 20. Further, in the hole edge part of the orifice 18, an R-shape 22 having an R-chamfer shape is given to an inner part of the blow molding body 12. The orifice 18 communicates with a gap 42 formed between the bracket 30 and the instrument panel reinforcement 40.

Figure 3:
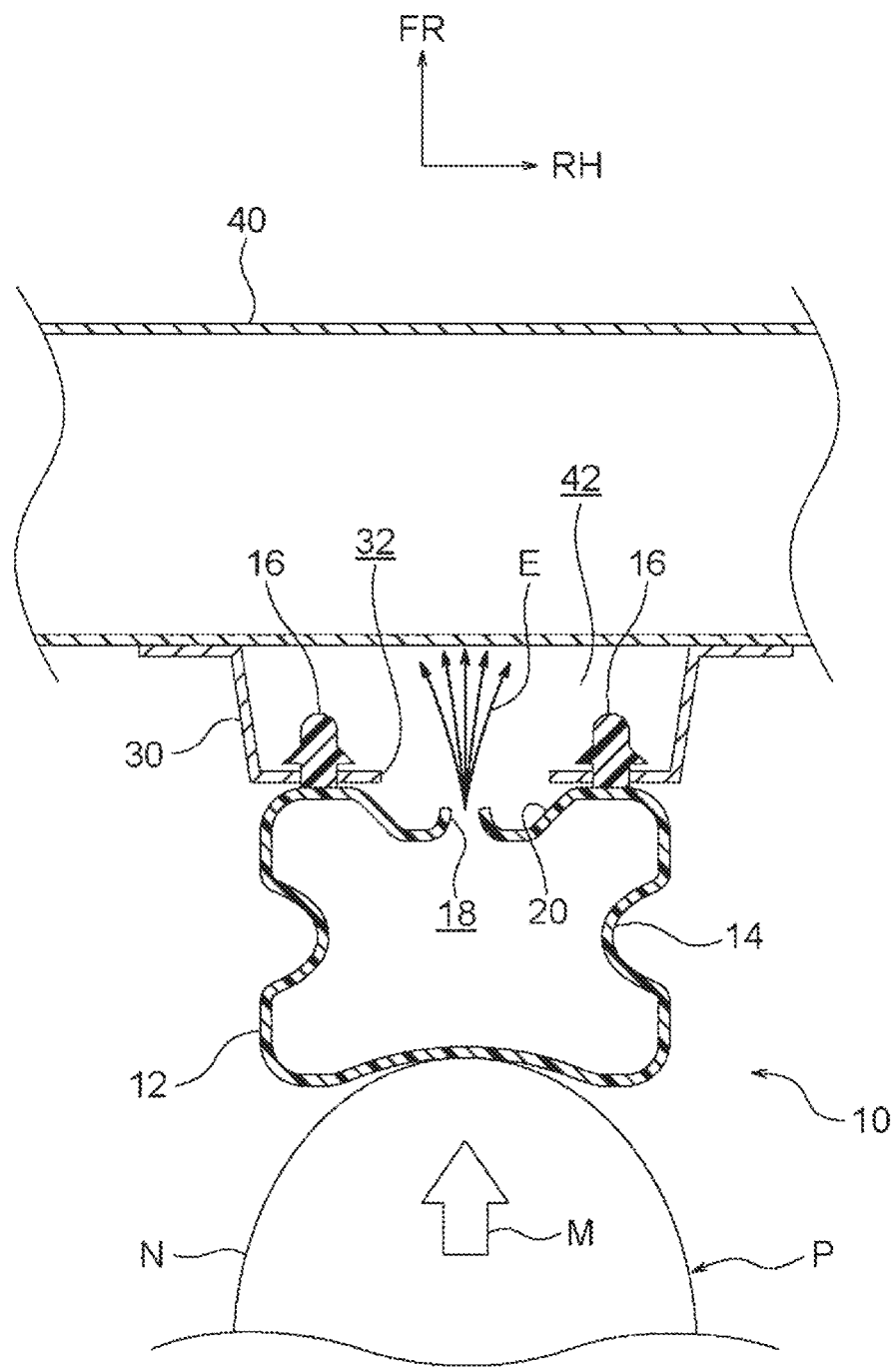
FIG. 3 is a sectional view corresponding to FIG. 2 and illustrates a state of an initial stage of deformation of a blow molding body according to the first embodiment.
Figure 4:
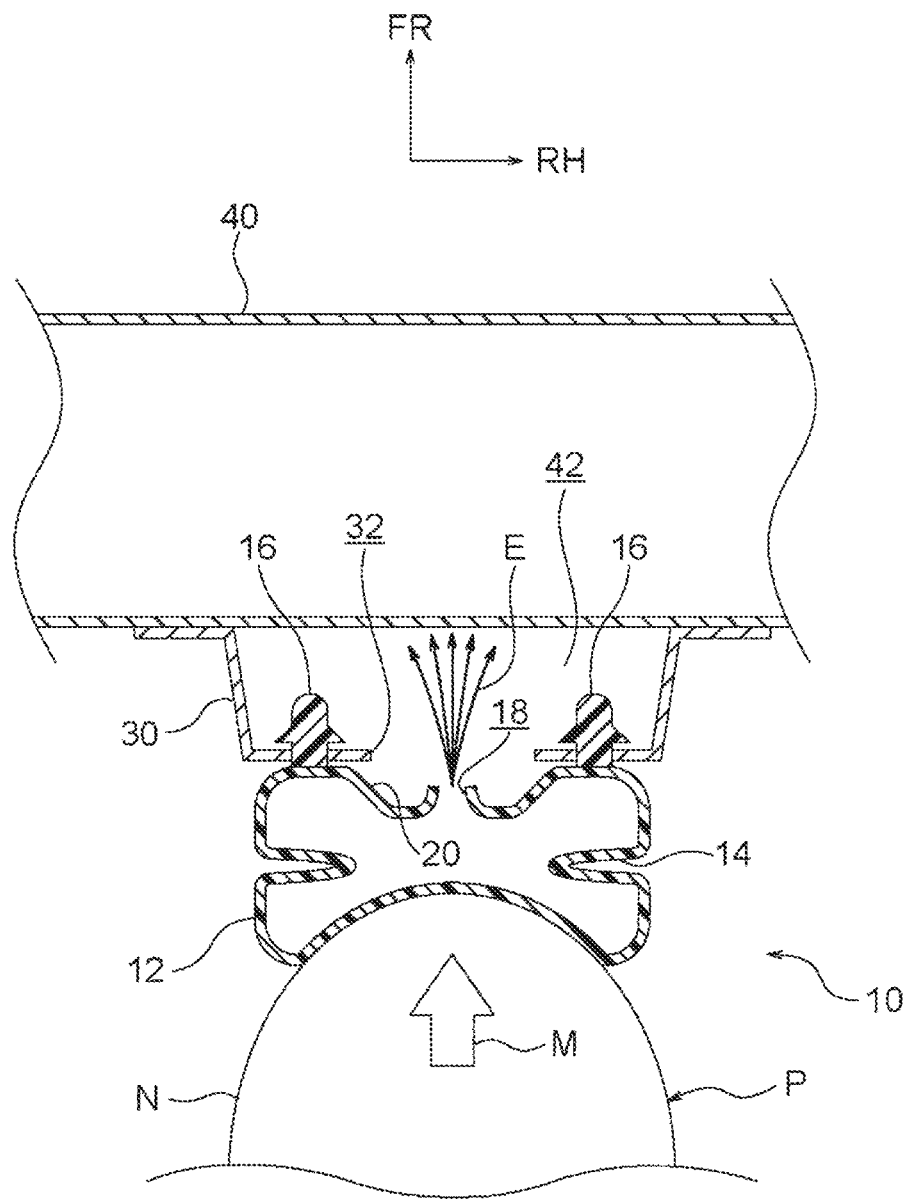
FIG. 4 is a sectional view corresponding to FIG. 2 and illustrates a state of a later stage of the deformation of the blow molding body according to the first embodiment.
Figure 5:
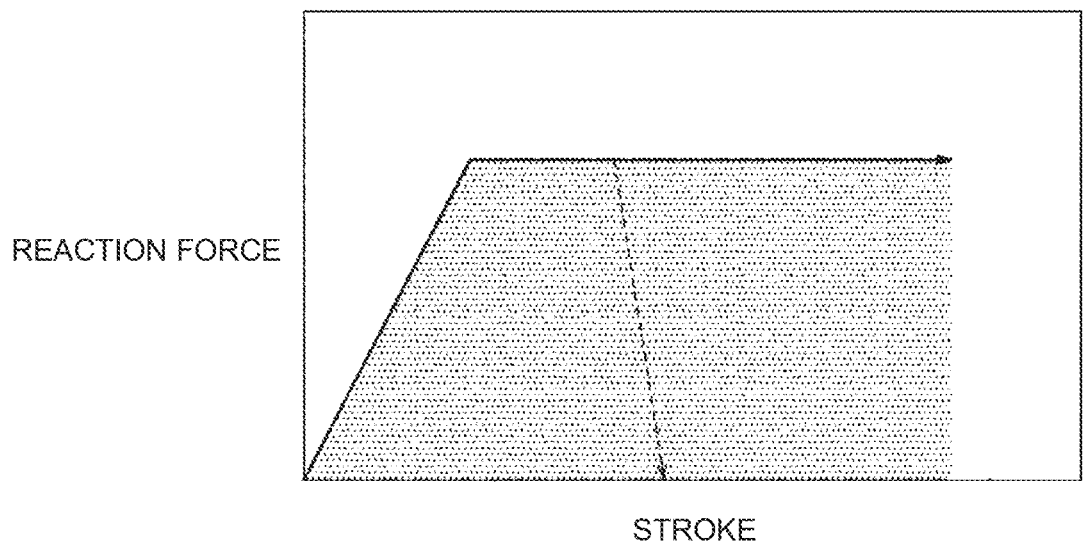
FIG. 5 is a line drawing illustrating an FS characteristic of the blow molding body according to the first embodiment.

In the present embodiment, as illustrated in FIGS. 3, 4, when the vehicle has a front end collision, negative acceleration occurs in the vehicle, so that the occupant P moves forward relative to the vehicle by inertia (see an arrow M in FIGS. 3, 4). As a result, the knee N of the occupant is pressed against the rear wall portion 12B of the blow molding body 12 via the instrument panel, so that the blow molding body 12 deforms plastically by being compressed between the knee N and the bracket 30. At this time, the part, of the peripheral wall portion 12C of the blow molding body 12, to which the recessed shape 14 is given is bent inwardly in the blow molding body 12 (see FIG. 4). Further, when the blow molding body 12 is compressed as described above, an internal pressure of the blow molding body 12 increases, so that air in the blow molding body 12 is discharged outside the blow molding body 12 from the orifice 18 (see arrows E in FIGS. 3, 4). That is, the orifice 18 is formed in the blow molding body 12 so as to discharge the air inside the blow molding body 12 to its outside due to an increase in the internal pressure at the time when the blow molding body 12 is compressed.

Operations and Effects

The following describes operations and effects of the present embodiment.

In the present embodiment, when the vehicle has a front end collision, the knee N of the occupant moves forward by inertia, so that the blow molding body 12 deforms plastically by being compressed between the knee N of the occupant P and the bracket 30. Hereby, impact energy of the occupant P is absorbed, so that the knee N of the occupant P is restrained. As a result, the inertial movement of the body of the occupant P, including the lower limb of the occupant P, is restricted, thereby making it possible to avoid the head of the occupant P from making contact with windshield glass or the like of the vehicle. However, when the restraint of the knee N is too strong, the lower limb is injured, but when the restraint of the knee N is too weak, the contact of the head with the windshield glass or the like occurs.

In this respect, in the present embodiment, when the blow molding body 12 is compressed as described above, the internal pressure inside the blow molding body 12 increases, so that the air in the blow molding body 12 is discharged to outside the blow molding body 12 via the orifice 18. Due to a viscous resisting force of the air flowing out via the orifice 18, a phenomenon that the blow molding body 12 buckles at a stretch in the middle of deformation can hardly occur. As a result, a crack or the like can hardly occur in the blow molding body 12 in the middle of deformation. This can prevent or effectively restrain a rapid decrease in a reaction force to be applied to the knee N from the blow molding body 12.

That is, in the present embodiment, it is possible to delay the decrease in the reaction force to be applied to the knee N from the blow molding body 12. This makes it possible to maintain the reaction force until a second half of a compression stroke of the blow molding body 12. As a result, the occupant P can be decelerated by taking time while a maximum value of the reaction force to be applied to the knee N from the blow molding body 12 is restrained. Hereby, the lower limb can be hardly injured. Besides, a knee bolster using a hollow blow molding body is inexpensive and light in weight in comparison with a metal knee bolster, a knee bolster made of hard urethane foam, or the like, and the reaction force to be applied to the knee N rises satisfactorily. Accordingly, even in a vehicle that can hardly secure a sufficient compression stroke of the blow molding body 12 due to restriction on a space inside a vehicle cabin, for example, appropriate protection for the occupant P is achievable. The following provides an additional note to the above effect with reference to Table 1 and FIG. 5.

TABLE 1

| Structure type | Restraining performance | | Economic efficiency | |
| --- | --- | --- | --- | --- |
| | Rising of reaction force | Persistency of reaction force | Cost | Weight |
| Steel sheet bracket type | Depending on shape | | Good | Poor |
| Hard urethane foam type | Poor | Excellent | Poor | Good |
| Conventional PE blow molding type | Excellent | Poor | Excellent | Excellent |
| Blow molding body 12 | Excellent | Excellent | Excellent | Excellent |

Table 1 exhibits comparisons between structure types for a knee bolster in terms of restraining performance and economic efficiency. A knee bolster of a steel sheet bracket type can secure rising of reaction force and persistency of reaction force depending on setting of a shape but has a problem in cost and weight. A knee bolster of a hard urethane foam type has good persistency of reaction force but has a problem in rising of reaction force, cost, and weight. A knee bolster of a conventional polyethylene (PE) blow molding type is excellent in rising of reaction force, cost, and weight but has a problem in persistency of reaction force.

On the other hand, the blow molding body 12 according to the present embodiment can secure persistency of reaction force. Accordingly, it is possible to increase an effective area (the area of a region with hatching in FIG. 5) of an FS diagram illustrated in FIG. 5. The knee bolster of the conventional PE blow molding type buckles at a stretch in the middle of deformation, so that a reaction force suddenly decreases (see a broken line in FIG. 5). Accordingly, the effective area is small. As the effective area is larger, the occupant can be decelerated more efficiently while a maximum acceleration to be caused in the lower limb is restrained at the time of restraining the lower limb. However, the compression stroke of the knee bolster may not be increased due to restriction on a space of the vehicle, or the like. In this respect, in the present embodiment, by solving the weak point of the knee bolster of the conventional PE blow molding type, it is possible to achieve economic efficiency in both cost and weight while extremely excellent restraining performance with fast rising of reaction force and high persistency of reaction force is achieved. Further, the present embodiment is achievable with a markedly simplified configuration in comparison with a configuration in which an impact to the knee of the occupant is absorbed by a knee airbag device including an airbag and an inflator, for example.

Further, in the present embodiment, the blow molding body 12 is provided with the orifice 18 formed in the front wall portion 12A placed to face the bracket 30. The front wall portion 12A is a part that does not largely deform at the time when the blow molding body 12 is compressed and can be hardly displaced relative to the bracket 30. Accordingly, in comparison with a configuration in which an air discharge hole is provided in the peripheral wall portion 12C or the rear wall portion 30A in the blow molding body 12, it is easy to take measures to prevent unexpected closing of the orifice 18 at the time when the blow molding body 12 is compressed. For example, in a case where the orifice 18 is provided in the peripheral wall portion 12C, the orifice 18 may be closed due to deformation of the peripheral wall portion 12C. Further, for example, in a case where the orifice 18 is provided in the rear wall portion 30A, the orifice 18 may be closed by the instrument panel (not illustrated). In this respect, in a case where the orifice 18 is provided in the front wall portion 12A like the present embodiment, a shape to prevent closing of the orifice 18 can be given to at least either one of the blow molding body 12 and the bracket 30 in advance. Hereby, the above measures can be taken easily.

That is, in the present embodiment, in the blow molding body 12, the front wall portion 12A attached to the bracket 30 has the recessed portion 20 formed in the vicinal part around the orifice 18 such that the recessed portion 20 is recessed to the side reverse to the bracket 30. Further, the bracket 30 has the air outflow hole 32 formed in a part facing the orifice 18, so that the bracket 30 is formed in a shape opened at the part. From these points, it is possible to prevent discharging of the air via the orifice 18 from being disturbed by the bracket 30 with a simple configuration. Note that the above effects can be provided when at least either one of the recessed portion 20 and the air outflow hole 32 is provided.

Further, in the present embodiment, the orifice 18 of the blow molding body 12 communicates with the gap 42 formed between the bracket 30 and the instrument panel reinforcement 40 to which the bracket 30 is fixed. Hereby, when the blow molding body 12 is compressed, the air inside the blow molding body 12 can be discharged to the gap 42 via the orifice 18, so that an air discharge passage can be secured with a simple configuration.

Further, in the present embodiment, the recessed shape 14 recessed inwardly in the blow molding body 12 is given to the peripheral wall portion 12C of the blow molding body 12 along the circumferential direction of the peripheral wall portion 12C. Accordingly, when the blow molding body 12 is compressed between the bracket 30 and the knee N of the occupant P, the peripheral wall portion 12C can be deformed as set, thereby making it possible to achieve a stable deformation mode of the blow molding body 12.

Further, in the present embodiment, in the hole edge part of the orifice 18, the R-shape 22 is given to the inner part of the blow molding body 12. Hereby, an air stream to be discharged via the orifice 18 can be made a laminar flow, thereby making it possible to restrain occurrence of a turbulent flow. As a result, it is possible to easily adjust the reaction force to be applied to the knee N of the occupant P from the blow molding body 12, for example.

Further, in the present embodiment, the impact absorber of the vehicle knee bolster 10 is the blow molding body 12 manufactured by blow molding. Accordingly, the impact absorber can be manufactured easily at low cost in comparison with a configuration in which a hollow-shaped impact absorber is manufactured by joining a plurality of members manufactured by injection molding, for example.

Next will be described a second embodiment of the present disclosure. Note that constituents and operations basically similar to the constituents and operations of the first embodiment have the same reference signs as the constituents and operations of the first embodiment, and their descriptions are omitted.

Second Embodiment

Figure 6:
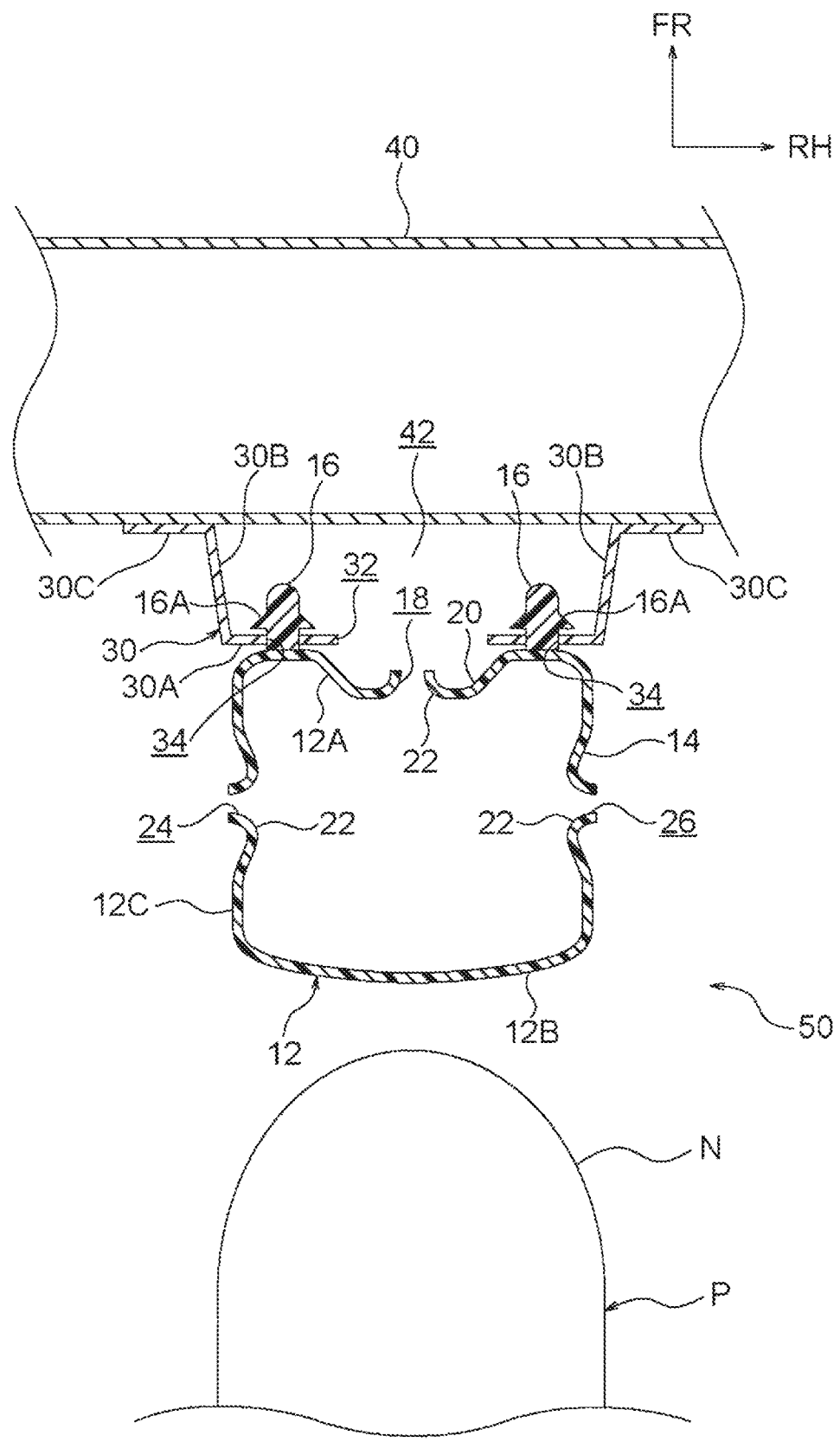
FIG. 6 is a sectional view illustrating a partial configuration of a vehicle knee bolster to which an impact absorption structure according to a second embodiment is applied.

FIG. 6 is a sectional view illustrating a partial configuration of a vehicle knee bolster 50 to which an impact absorption structure according to a second embodiment of the present disclosure is applied. In the vehicle knee bolster 50, the blow molding body 12 includes two orifices 24, 26 separately from the orifice 18. The second embodiment has a configuration similar to that of the first embodiment except the above configuration. The two orifices 24, 26 correspond to "additional air discharge holes" in the present disclosure. Hereinafter, the orifice 18 is referred to as a "first orifice 18," the orifice 24 is referred to as a "second orifice 24," and the orifice 26 is referred to as a "third orifice 26."

The second orifice 24 is formed in a part of the peripheral wall portion 12C of the blow molding body 12, the part facing the left side in the vehicle right-left direction, and the third orifice 26 is formed in a part of the peripheral wall portion 12C, the part facing the right side in the vehicle right-left direction. The blow molding body 12 is configured not to have a hole or an opening other than the first orifice 18, the second orifice 24, and the third orifice 26. Note that the second orifice 24 and the third orifice 26 may be formed in respective parts of the peripheral wall portion 12C, the parts facing the upper side or the lower side in the vehicle up-down direction.

Figure 7:
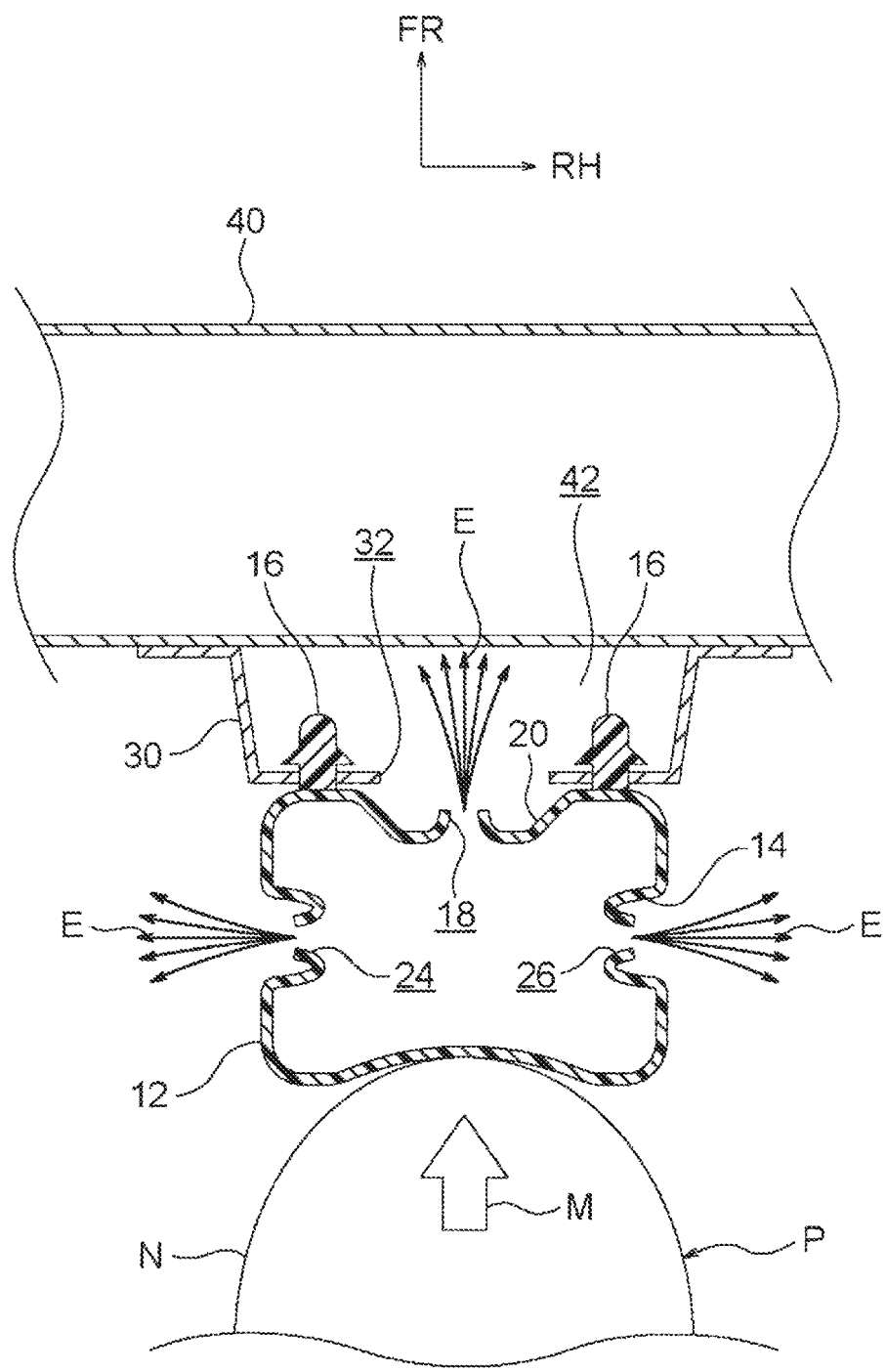
FIG. 7 is a sectional view corresponding to FIG. 6 and illustrates a state of an initial stage of deformation of a blow molding body according to the second embodiment.
Figure 8:
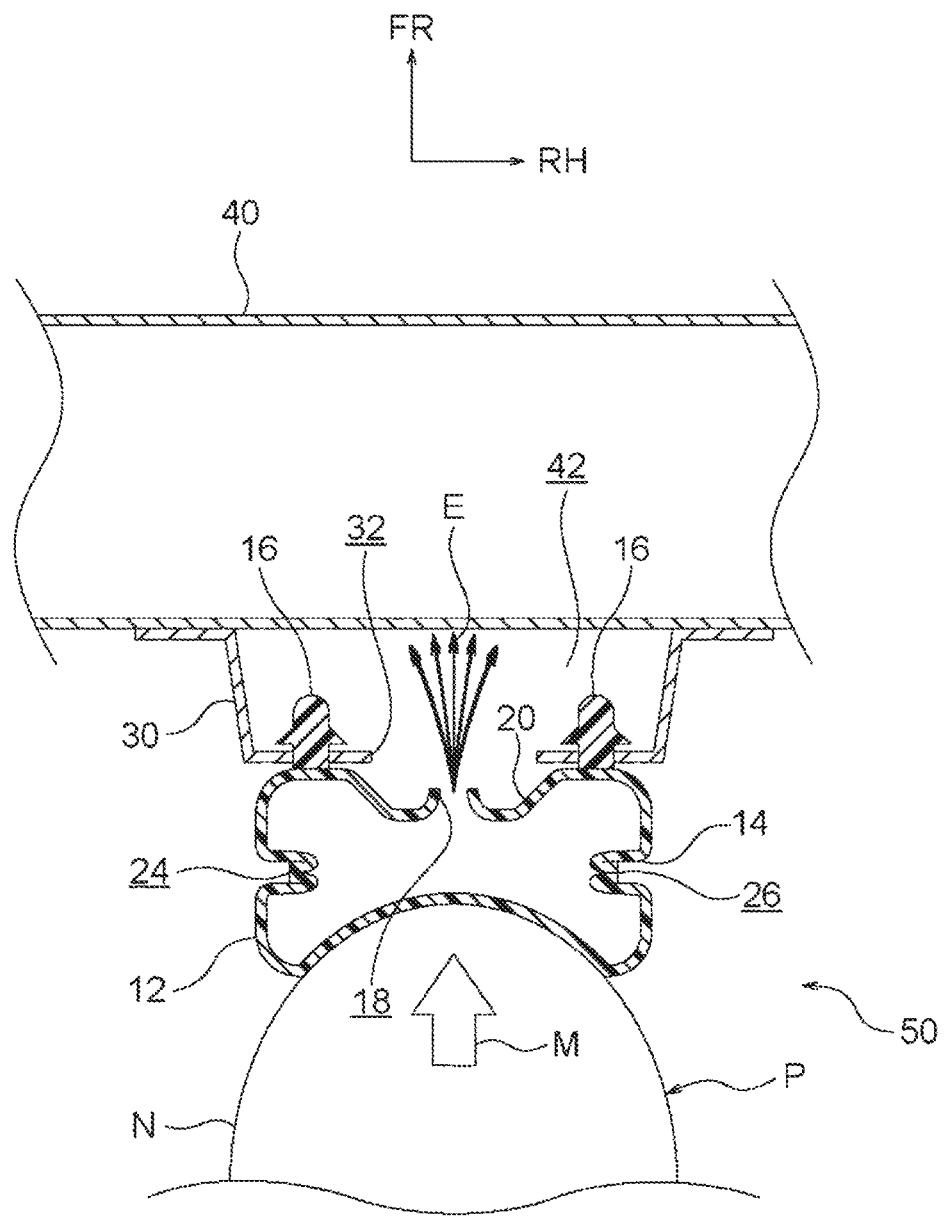
FIG. 8 is a sectional view corresponding to FIG. 6 and illustrates a state of a later stage of the deformation of the blow molding body according to the second embodiment.

Similarly to the first orifice 18, the second orifice 24 and the third orifice 26 are formed in the blow molding body 12 so as to discharge the air inside the blow molding body 12 to its outside due to an increase in the internal pressure at the time when the blow molding body 12 is compressed. However, in the peripheral wall portion 12C, parts where the second orifice 24 and the third orifice 26 are formed are parts to which the recessed shape 14 is given. As illustrated in FIGS. 7, 8, the parts to which the recessed shape 14 is given are parts to be crushed in the vehicle front-rear direction at the time when the blow molding body 12 is compressed between the bracket 30 and the knee N of the occupant P. Accordingly, when the parts to which the recessed shape 14 is given are crushed in the vehicle front-rear direction, the second orifice 24 and the third orifice 26 are closed or narrowed, so that the discharge of the air via the second orifice 24 and the third orifice 26 is disturbed.

Figure 9:
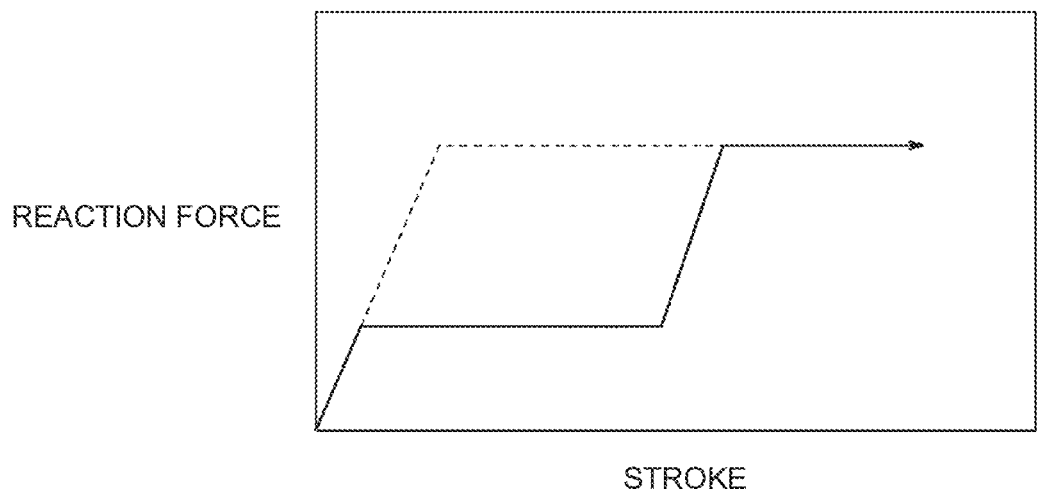
FIG. 9 is a line drawing illustrating an FS characteristic of the blow molding body according to the second embodiment.

The present embodiment has a configuration similar to that of the first embodiment except the above configuration. On this account, even in the present embodiment, it is possible to restrain a rapid decrease in a reaction force to be applied to the knee N from the blow molding body 12, similarly to the first embodiment. Besides, in the present embodiment, when the blow molding body 12 is compressed, the air is discharged via the second orifice 24 and the third orifice 26 in addition to the first orifice 18. The second orifice 24 and the third orifice 26 are provided in parts to be crushed in the blow molding body 12 at the time when the blow molding body 12 is compressed. When the parts are crushed, the second orifice 24 and the third orifice 26 are closed or narrowed, so that the discharge of the air via the second orifice 24 and the third orifice 26 is disturbed. Hereby, as illustrated in FIG. 9, the reaction force to be applied to the knee N from the blow molding body 12 can be changed in a stepwise manner in accordance with an increase in the compression stroke of the blow molding body 12. As a result, regardless of the build of the occupant P or whether the occupant P wears a seatbelt or not, it is possible to protect the occupant P appropriately.

Figure 10:
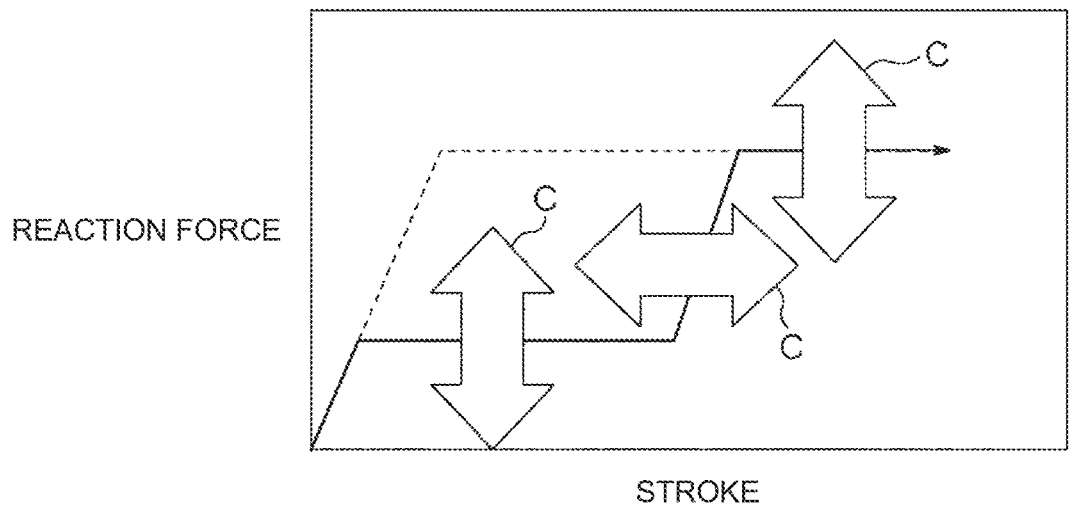
FIG. 10 is a line drawing corresponding to FIG. 8 to describe changes in the FS characteristic of the blow molding body according to the second embodiment.

Besides, in the present embodiment, the second orifice 24 and the third orifice 26 as a plurality of additional air discharge holes are formed in the blow molding body 12. Accordingly, by changing hole diameters, positions, or the like of the second orifice 24 and the third orifice 26, it is possible to adjust a timing to change the reaction force to be applied to the knee N from the blow molding body 12 or a magnitude of the reaction force (see arrows C in FIG. 10). Further, for example, it is possible to change the reaction force in a multistage manner.

Further, in the present embodiment, the recessed shape 14 is given to the peripheral wall portion 12C of the blow molding body 12, and the second orifice 24 and the third orifice 26 are formed in respective parts to which the recessed shape 14 is given. When the parts are crushed in a compression direction as set at the time when the blow molding body 12 is compressed, the second orifice 24 and the third orifice 26 can be closed or narrowed as set.

Figure 11:
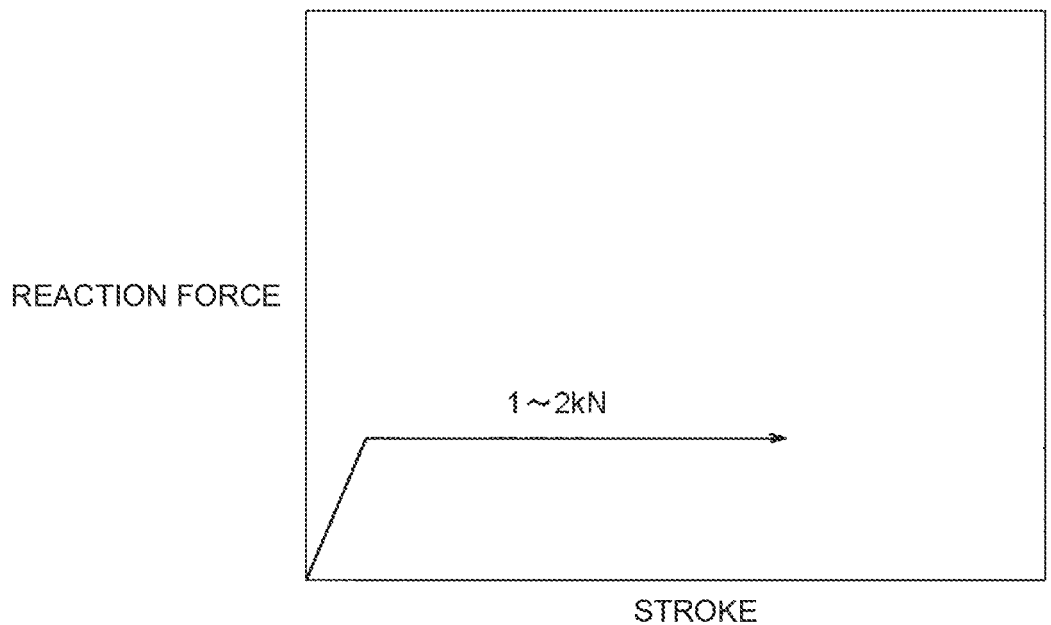
FIG. 11 is a line drawing to describe an FS characteristic that is requested when a dummy doll of AF05 that wears a seatbelt is restrained by the vehicle knee bolster.
Figure 12:
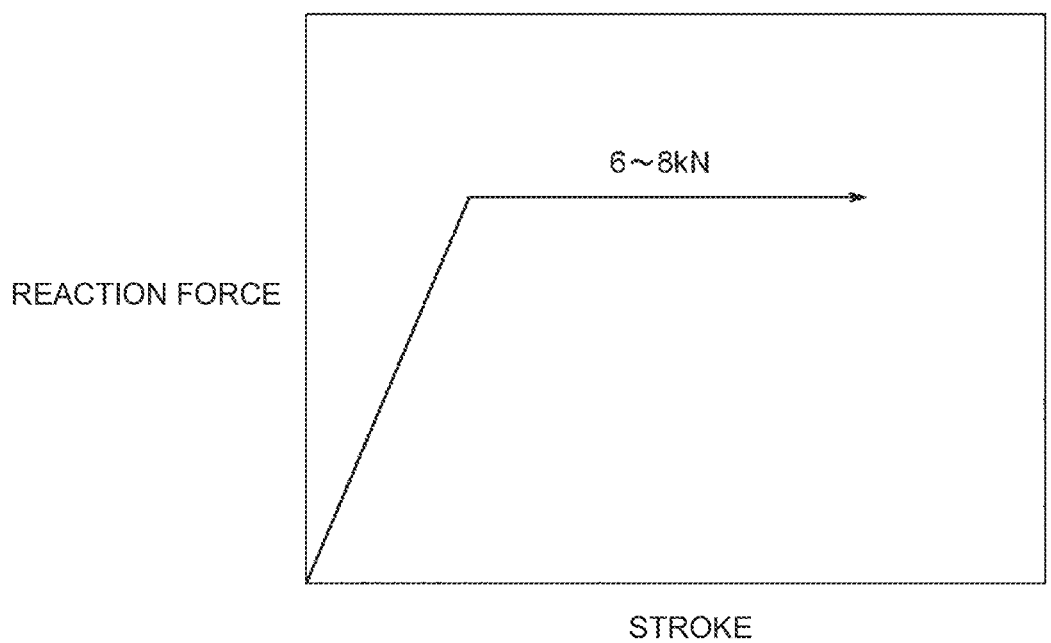
FIG. 12 is a line drawing to describe an FS characteristic that is requested when a dummy doll of AM50 that does not wear a seatbelt is restrained by the vehicle knee bolster.

The following provides an additional note to the above effects with reference to FIGS. 11, 12. In Federal Motor Vehicle Safety Standard No. 208, front end collision tests are performed under the condition that an AF05 dummy wears a seatbelt and also under the condition that an AM50 dummy does not wear the seatbelt. In order to cover these conditions, it is necessary to restrain the knees of an occupant in addition to a pretensioner or a force limiter of the seatbelt. In that case, for example, under the condition that the AF05 dummy wears the seatbelt, a reaction force required to restrain the knees is 1 kN to 2 kN, and under the condition that the AM50 dummy does not wear the seatbelt, a reaction force required to restrain the knees is 6 kN to 8 kN. In order to cover the reaction force in such a wide range by a knee airbag device, for example, a control to change the reaction force is required, so that an expensive system is required. In this respect, in the present embodiment, by use of an inexpensive hollow blow molding body, it is possible to control the reaction force relative to the compression stroke by changing the reaction force in a stepwise manner.

Note that, in the above embodiments, the orifice 18 (the air discharge hole) is formed in the front wall portion 12A placed to face the bracket 30 in the blow molding body 12. However, the present disclosure is not limited to this. For example, an air discharge hole may be formed in a part that can be hardly crushed at the time when the blow molding body 12 is compressed. The part is a front end part of the peripheral wall portion 12C or the like.

Further, in the above embodiments, the vicinal part around the orifice 18 in the front wall portion 12A of the blow molding body 12 is provided as the recessed portion 20 recessed to the side reverse to the bracket 30, and the bracket 30 is formed in a shape opened at a part facing the orifice 18. However, the present disclosure is not limited to this. For example, in a case where the air discharge hole is formed in the front end part of the peripheral wall portion 12C as described above, the recessed portion 20 or the shape thus opened is not required.

Further, in the above embodiments, the orifice 18 communicates with the gap 42 formed between the instrument panel reinforcement 40 and the bracket 30. However, the present disclosure is not limited to this. For example, while a part, of the bracket 30, that faces the orifice 18 may be closed, the recessed portion 20 of the blow molding body 12 may be opened toward the upper side, the lower side, the left side, or the right side of the blow molding body 12.

Further, in the above embodiments, the recessed shape 14 recessed inwardly in the blow molding body 12 is given to the peripheral wall portion 12C of the blow molding body 12 along the circumferential direction of the peripheral wall portion 12C, so that a stable deformation mode of the blow molding body 12 is achieved. However, the present disclosure is not limited to this. For example, the recessed shape 14 or a projecting shape may not be given to the peripheral wall portion 12C.

Further, in the second embodiment, the blow molding body 12 includes the second orifice 24 and the third orifice 26 that are two additional air discharge holes. However, the present disclosure is not limited to this. The number of the additional air discharge holes is modifiable appropriately.

Further, in the above embodiments, the blow molding body 12 (the impact absorber) is formed in a hollow hexahedron shape. However, the present disclosure is not limited to this. The shape of the impact absorber is modifiable appropriately. For example, the impact absorber may be formed to have a circular shape, an elliptical shape, or a hexagonal shape when the impact absorber is viewed in its compression direction.

Further, in the above embodiments, the blow molding body 12 is provided as an impact absorber. However, the present disclosure is not limited to this. For example, a hollow-shaped impact absorber may be manufactured such that two members having a box shape opened on one end side are manufactured by injection molding or press molding, and the opening sides of the two members are joined to each other.

Further, in the above embodiments, the impact absorption structure according to the present disclosure is applied to the vehicle knee bolster 10. However, the present disclosure is not limited to this. The impact absorption structure according to the present disclosure can be disposed, as a structure to protect an occupant of a vehicle, in an interior member (e.g., a vehicle seat, a side door, or the like) with which the occupant is to collide when the vehicle has a collision.

In addition, the present disclosure can be performed with various modifications without departing from the gist of the present disclosure. Further, it is needless to say that the scope of the present disclosure is not limited to the above embodiments.

What is claimed is:

1. An impact absorption structure comprising an impact absorber formed in a hollow shape and attached to an attachment portion provided in a vehicle cabin of a vehicle, wherein:
   when the vehicle has a collision, the impact absorber deforms plastically by being compressed between the attachment portion and an occupant;
   the impact absorber has an air discharge hole through which air inside the impact absorber is discharged to outside when an internal pressure of the impact absorber increases due to the compressions;
   the impact absorber has the air discharge hole in a wall portion attached to the attachment portion; and
   a vicinal part around the air discharge hole in the wall portion of the impact absorber is provided as a recessed portion recessed to a side reverse to the attachment portion.

2. The impact absorption structure according to claim 1, wherein the attachment portion is formed in a shape opened at a part facing the air discharge hole.

3. The impact absorption structure according to claim 2, wherein:
   the attachment portion is a bracket fixed to an interior member of the vehicle; and
   the air discharge hole communicates with a gap formed between the bracket and the interior member.

4. The impact absorption structure according to claim 1, wherein a projecting shape projecting outwardly from the impact absorber or a recessed shape recessed inwardly in the impact absorber is given to a peripheral wall portion, of the impact absorber, via which the wall portion placed to face the attachment portion is connected to a further wall portion placed to face the occupant, the projecting shape or the recessed shape being formed in a circumferential direction of the impact absorber.

5. The impact absorption structure according to claim 4, wherein, in addition to the air discharge hole, the impact absorber has an additional air discharge hole through which the air inside the impact absorber is discharged to outside when the internal pressure of the impact absorber increases due to the compression, the additional air discharge hole being formed in a part, of the impact absorber, that is to be crushed when the impact absorber is compressed.

6. The impact absorption structure according to claim 5, wherein the part, of the impact absorber, that is to be crushed when the impact absorber is compressed is a part, of the peripheral wall portion, to which the projecting shape or the recessed shape is given.

7. The impact absorption structure according to claim 1, wherein, in addition to the air discharge hole, the impact absorber has an additional air discharge hole through which the air inside the impact absorber is discharged to outside when the internal pressure of the impact absorber increases due to the compression, the additional air discharge hole being formed in a part, of the impact absorber, that is to be crushed when the impact absorber is compressed.

8. The impact absorption structure according to claim 7, wherein the impact absorber has a plurality of additional air discharge holes.

9. The impact absorption structure according to claim 1, wherein the impact absorber is a blow molding body manufactured by blow molding.

10. The impact absorption structure according to claim 1, wherein the impact absorber is provided as a constituent component of a vehicle knee bolster and placed in front of a knee of the occupant in a vehicle front-rear direction.

* * * * *